2,877,557
SAW-LOG SCALING IMPLEMENT

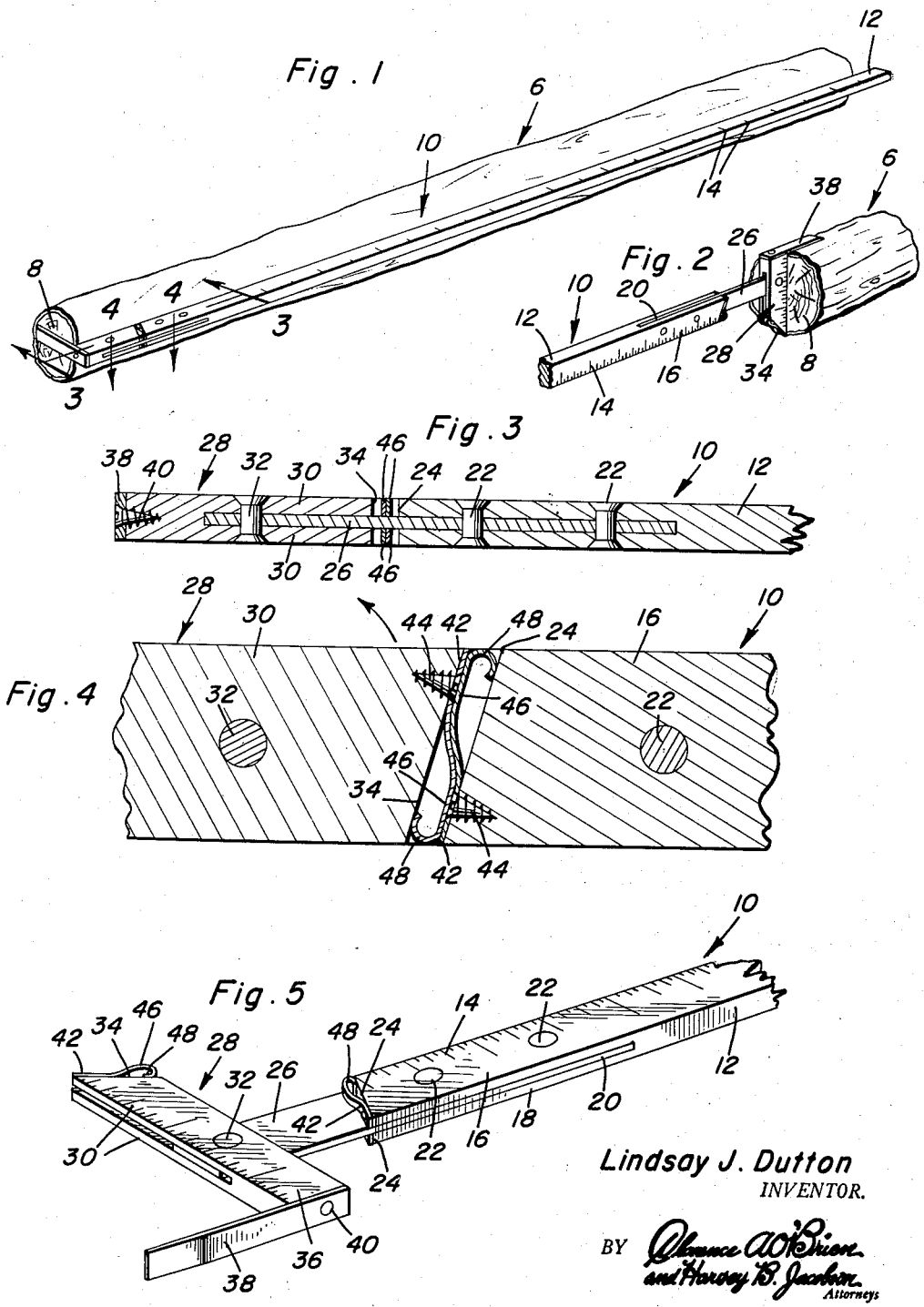

Lindsay J. Dutton, Naches, Wash.

Application January 8, 1957, Serial No. 633,014

3 Claims. (Cl. 33—93)

The present invention relates to a measuring implement, generally speaking, and has reference in particular to an implement which is expressly designed and therefore suitably adapted to serve the needs and purposes of a so-called scaler whose duty it is to estimate and furnish information in respect to saw-logs and which depends on individually measuring the logs to obtain the length and diameter measurements thereof.

Obtaining the information desired has, until the advent of the instant invention, depended upon the use of a simple saw-log scaling stick. At present this stick comprises a simple one-piece linearly straight rule with graduated measuring scales impressed or otherwise displayed thereon. In some instances the ordinary scaling stick is provided at one end with a lateral blade or spud which serves as a log-end abutment and facilitates locating and positioning the stick to provide the length measurement desired. Also, and as is perhaps well known, most scaling jobs are undertaken after the logs are loaded on a track, a flat-car, or when they are stacked in piles in the woods or perhaps at railroad sidings. Manifestly, the logs are seldom of exact same lengths and in fact may be one or two feet shorter than others and when they are in stacks it is quite difficult to handle the measuring requirements, especially with the scaling stick currently in use.

The above and other difficulties and conditions have posed a problem. That is to say, the commonly used scaling stick cannot be satisfactorily and reliably employed to furnish the scaler with the length and diameter measurements needed. In fact one can well imagine the difficulty that the log scaler encounters when he attempts to measure the diameter of the log which is situated in a pile of logs many of which logs are longer than the one which he seeks to measure. In such a situation it is virtually impossible to accurately measure the diameter and in many instances this needed information is often left strictly to a rough estimate of the scaler.

The instant invention seeks to solve the problem by providing a sectional measuring rule or stick which is characterized by a relatively long primary section and a shorter auxiliary or secondary section, the latter being hingedly mounted, both sections being graduated, and the short section having a lateral abutment at its outer end. With this arrangement it is possible to utilize the short section as a head and to move it to a position at right angles to the axis of the longer section and to be able to take the measurements required despite the unsystematic manner in which the logs may be piled up while the scaler is working.

Other objects, features and advantages will become more readily apparent from the following description and the accompanying sheet of illustrative drawings.

In the drawings wherein like numerals are employed to designate like parts throughout the views:

Figure 1 is a perspective view showing the improved scaling implement and how it is used in measuring the length of a saw-log;

Figure 2 is a view in perspective showing a fragmentary portion of a log and illustrating how the pivoted or hinged head section is angled to obtain a diameter measurement;

Figure 3 is an enlarged fragmentary sectional and elevational view taken approximately on the plane of the line 3—3 of Figure 1, looking in the direction of the arrows;

Figure 4 is an enlarged fragmentary section taken on the plane of the line 4—4 of Figure 1; and Figure 5 is a perspective view with a portion broken away and drawn on a satisfactorily large scale to facilitate understanding the details of construction and which view shows the right angular position of the secondary or head section of the implement.

Referring to Figure 1 the saw-log is denoted by the numeral 6, the measurable end thereof at 8. The sectional scaling stick or implement is constructed of suitable material and is usually 5 or 6 feet in length. The linearly straight primary section is denoted by the numeral 10 and comprises a stick of suitable length having calibrations or graduations 14 along one lengthwise edge. The left end portion of the stick is bifurcated to provide furcations 16 and 18 and sandwiched between them is the end portion of a metal strip member 20 which is secured rigidly in place by spaced rivets or equivalent fasteners 22. It will be noticed particularly in Figure 5 that the left hand end portion of the strip member extends beyond the oblique angled ends 24 of the furcations as at 26 providing what is here conveniently referred to as a shank. The relatively short head section, sometimes referred to as the secondary section, is of suitable length and is denoted by the numeral 28 and this too is bifurcated at one end portion and the furcations are denoted by the numerals 30. These furcations straddle and are connected by a suitable hinging or pivoting rivet 32 to the shank. The oblique angled inner ends 34 are adapted to assume positions in opposed parallelism relative to the obliquely angled terminals 24 of the furcations 16 and 18. The outer end portion 36 is provided with a metal or an equivalent right angularly disposed blade 38 of suitable length and which is fixedly fastened at 40 to the end portion 30 and which serves as an abutment in the position shown in Figure 1 and also as a prong for anchoring purposes in the position shown in Figure 2. Thus it will be seen that at one end the primary section 10 has an extended shank on which the secondary section is hingedly mounted, making the sections foldable. When the sections are used for measuring the length they are in alignment with each other as shown in Figure 1. When used for obtaining the diameter the sections are at right angles to each other and the head abuts the end of the log and the prong is anchored on the log to assist in positioning the measuring head and holding it in place while taking the diameter measurements. Also and when the sections are in alignment spring clips are employed to assist in retaining the sections in this position.

There are four of these spring clips employed and they are positioned in pairs and in contactible relationship on opposite side faces of the extending shank 26 as seen in the drawings. The clips of the adjacent pairs are adapted to yieldably contact each other and therefore they are fastened on the cooperating oblique ends 24 and 36 respectively. They are disposed in reverse order as seen in Figure 4 and each clip or spring has a flat end portion 42 which is fitted flat against the cooperating surface and secured by a wood screw or the like 44. The end portion is bowed longitudinally as at 46 and has a return bend 48 at its terminal. These thus contacting and suitably bent spring clips serve as resilient retainers and consequently the sections 10 and 28 may be located in alignment and held. By manual pressure this hinge joint may be intentionally "broken" and the short section 28 may be swung to assume a position at right angles at which time it becomes a diameter measuring head.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use by a log scaler, a scaling implement through the medium of which the user may measure the length and also the diameter of saw-logs which are stacked in a pile on a truck, railroad siding, or elsewhere; said implement comprising an elongated rule embodying a relatively long primary linearly straight section suitably graduated, a straight relatively short secondary section also graduated and having a right angularly disposed log abutment at its outer end, and means hingedly connecting a portion of said secondary section to an adjacent cooperating outer end portion of the primary section, whereby said sections may be combined and aligned with each other for length measuring requirements and adjusted by hand so that the sections are at right angles to each other when used to obtain diameter measurements, the adjacent ends of said sections being oblique angled and provided with cooperating spring metal clips which cooperate, when in contact with each other, constitute releasable retaining elements, and serve to securely maintain the sections in longitudinal alignment with each other.

2. For use by a log scaler, a scaling implement through the medium of which the user may measure the length and also the diameter of saw-logs which are stacked in a pile on a truck, railroad siding, or elsewhere; said implement comprising an elongated rule embodying a relatively long primary linearly straight section suitably graduated, a straight relatively short secondary section also graduated and having a right angularly disposed log abutment at its outer end, the outer end of said primary section having a fixed projecting shank, the adjacent end portion of the secondary section being bifurcated, the furcations thus provided straddling and being hingedly mounted on said shank, the adjacent ends of said sections being oblique angled and provided with cooperating spring metal clips which cooperate, when in contact with each other and constituting releasable retaining elements and serving to securely maintain the sections in longitudinal alignment.

3. A saw-log scaling implement comprising an elongated rule embodying a linearly straight primary section having a suitably graduated measuring scale and bifurcated at one end, a strip member having a portion sandwiched and secured between the furcations and an additional portion projecting beyond the furcations and constituting a shank, a secondary head-section also bifurcated and providing furcations, said furcations straddling the shank and being hingedly connected to said shank and permitting said secondary section to be lined up with the primary section for length measuring needs, or swung on the hinged connection and disposed at right angles to the primary section and used for diameter measuring requirements, a rigid prong-like abutment secured at one end to an adjacent end of said secondary section and projecting at right angles therefrom, adjacent ends of the respective furcations of the respective sections being at oblique angles to each other, and spring clips fastened to the oblique angled ends of the respective furcations, said clips having longitudinally bowed resilient portions and said resilient portions being opposed and releasably engageable with each other in a manner and for the purposes described.

References Cited in the file of this patent
UNITED STATES PATENTS

| | | |
|---|---|---|
| 392,091 | Andrews | Oct. 30, 1888 |
| 527,385 | Emery | Oct. 9, 1894 |
| 841,627 | Cloud | Jan. 15, 1907 |
| 1,489,239 | Eagan | Apr. 8, 1924 |